United States Patent Office 3,505,541
Patented Apr. 7, 1970

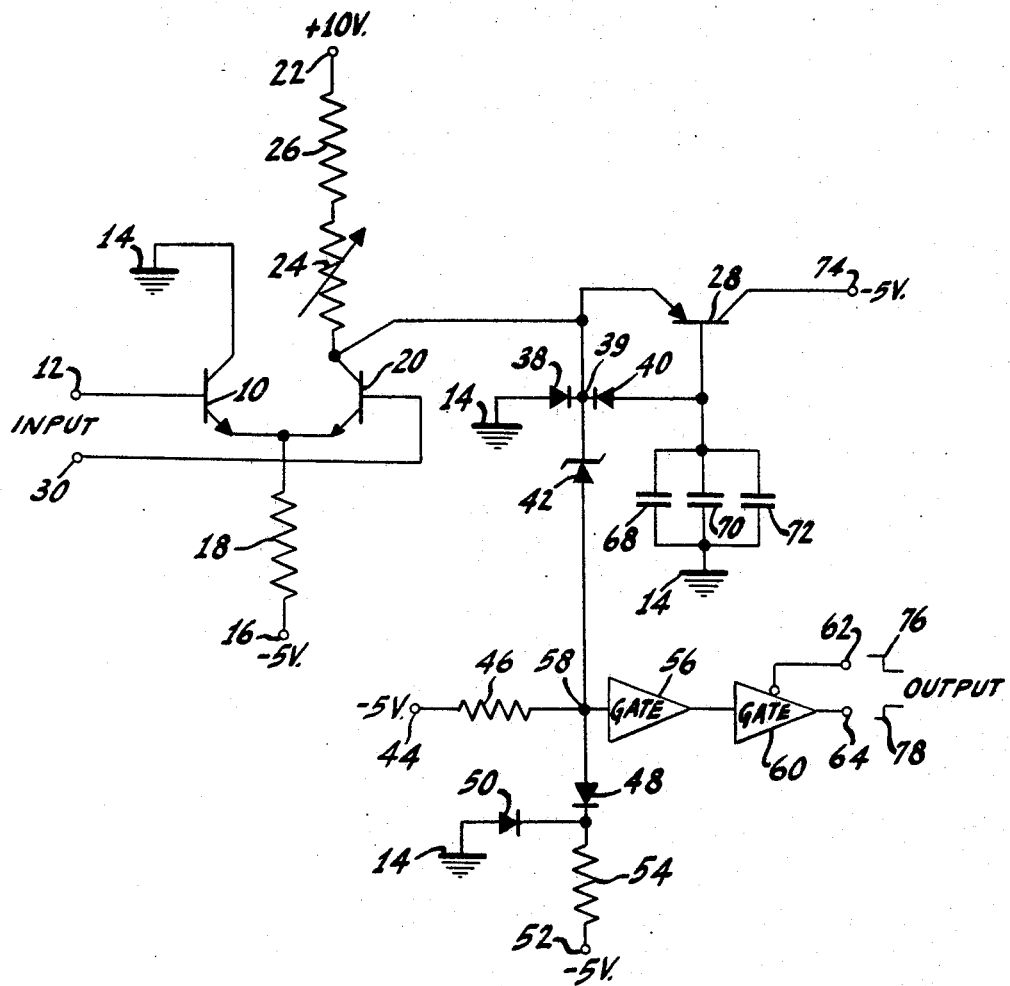

3,505,541
ELECTRONIC TIMER
Alfredo S. Sheng, Cherry Hill, and Emile Hebert, Willingboro, N.J., assignors to RCA Corporation, a corporation of Delaware
Filed July 29, 1966, Ser. No. 569,539
Int. Cl. H03k *17/26*
U.S. Cl. 307—293                               3 Claims

ABSTRACT OF THE DISCLOSURE

An elapsed time indicator is provided by charging a timing capacitor through a timing resistor and the emitter-to-base path of a transistor in series, the voltage of the collector of the transistor being kept constant. Since the flow of current into the capacitor is reduced by this connection by a factor of the beta +1 of the transistor, which may be 100, a time duration of 10 to 15 seconds may be indicated by a resistor and a non-electrolytic capacitor of practical size.

---

This invention relates to a long period electronic timer device such as a timer measuring periods in the order of ten seconds.

According to the prior art, a ten second timer includes a time constant circuit comprising a resistor and a large capacitor in the order of several hundred microfarads. To reduce the cost and to reduce the space requirements of the capacitor, a tantalum electrolytic capacitor of the required size is used. A high capacity tantalum electrolytic capacitor has such high leakage, such low temperature stability and such high capacity drift during its life that the design of a reliable reasonably accurate timer using such a capacitor is difficult.

It is an object of this invention to provide an improved long time timer device.

It is a further object of this invention to provide a long period timer device in which a relatively small, non-electrolytic capacitor may be used as the capacitor element of the time constant circuit thereof.

In accordance with this invention the time constant circuit comprises a resistor, a capacitor and a transistor. The resistor is connected in series with a source of charging current and with the emitter-to-collector path of the transistor while the capacitor is connected between the base of the transistor and a point of reference potential. The portion of the charging current that flows into the capacitor is very small, since the current flow in the base circuit of the transistor is equal to the difference between the emitter and the collector current and is measured by a factor beta. Beta +1 is equal to the ratio of the change in the emitter current to the change in base current of the transistor when the collector voltage of the transistor is kept constant. The value of beta +1 may numerically be equal to up to about 100. In such a time constant circuit, therefore, the effect of the time constant capacitor is multiplied by the beta +1 of the transistor, whereby a small capacitor of say about six microfarads is amply large enough to provide a time constant circuit having a time constant of at least ten seconds. A non-electrolytic capacitor of about six microfarads capacity or a plurality of non-electrolytic capacitors connected in parallel adding up to about six microfarads are relatively small and inexpensive and do not have the above-mentioned disadvantage of electrolytic capacitors. Means may be provided to start and stop the charging of the timing capacitor and to cause operation of an output circuit upon the emitter of the transistor comprising part of the timing circuit arriving at a predetermined voltage value.

The invention may be more readily understood upon reading of the following explanation in connection with the accompanying drawing, in which the figure is a schematic circuit diagram of a long period timer in accordance with this invention.

As shown in the figure, the base of a NPN transistor 10 is connected to an input terminal 12. The collector of the transistor 10 is connected to a voltage reference point such as ground 14, and the emitter thereof is connected to a terminal 16 of a source of voltage, not shown, through a resistor 18. The voltage on the terminal 16 may be five volts negative with respect to ground. The emitter of the transistor 10 is also connected directly to the emitter of a second NPN transistor 20, whose collector is connected to a terminal 22 of a source, not shown, through a time adjusting variable resistor 24 and a fixed resistor 26. The voltage on the terminal 22 may be ten volts positive wtih respect to ground. The collector of the transistor 20 is also connected to the emitter of a third transistor 28. The base of the transistor 20 is connected to a second input terminal 30. The anode of a diode 38 is connected to ground 14. The cathode of the diode 38 is connected through a junction point 39 to the emitter of the transistor 28 and to the cathode of a diode 40, and to the cathode of a Zener diode 42. The anode of the diode 40 is connected to the base of the transistor 28. The anode of the Zener diode 42 is connected to a terminal 44 of a voltage source, not shown, through a resistor 46. The voltage of the terminal 44 may be five volts negative with respect to ground. The anode of the Zener diode 42 is also connected to the anode of a germanium diode 48. The cathode of the diode 48 is connected to the cathode of a silicon diode 50 whose anode is connected to ground 14, and also to a terminal 52 of a voltage source, not shown, through a resistor 54. The voltage of the terminal 52 may be five volts negative with respect to ground. A gate circuit 56 may be connected to the junction 58 of the diodes 42 and 48 and the output of the gate 56 may be fed into a gate 60 which may have two output terminals 62 and 64. The output terminals 62 and 64 may be connected to operate a switching means, not shown, for turning an output means such as an indicator light, not shown, on or off.

A plurality of non-electrolytic capacitors 68, 70 and 72 are connected in parallel between the base of the transistor 28 and ground 14. If desired, one large capacitor may be substituted for the three capacitors 68, 70 and 72. The collector of the transistor 28 is connected to a terminal 74 which is maintained at about −5 volts by a source, not shown.

The operation of the long duration timer of the figure is as follows: At times when this circuit is quiescent, that is when it is not measuring time, the voltage at the input terminal 12 is maintained at about −1.6 volts and the voltage at the input terminal 30 is maintained at about −.8 volt with respect to ground. At these times, the transistor 10 exhibits high impedance between its collector and emitter or it is off, and the transistor 20 exhibits low impedance between its collector and emitter whereby it is on. Current flows from the terminal 22, through the resistors 26 and 24 and the collector-to-emitter path of the transistor 20 through the resistor 18 and to the terminal 16. Any charge that may have previously been applied to the capacitors 68, 70 and 72 discharges through the diode 40 and through the transistor 20 during this quiescent operation of the timer circuit. The collector of the transistor 20 and the emitter of the transistor 28 are clamped to a voltage of about one-half volt negative with respect to ground due to the connection of the diode 38 between the collector of the transistor 20 and the emitter of the transistor 28 and ground 14. That is, while the voltage of the point 39 can go more positive than one-half volt negative, it cannot become less positive than one-half volt negative. Therefore, at such times, there is no or very little charge on the capacitors 68, 70 and 72. The Zener diode 42 is off and the voltage of the point 58 is about —5 volts due to the connection thereto of the source connected to the terminal 44. The diode 48 does not conduct since its cathode is at about —.8 volt because of the voltage drop across the diode 50. The output of the gate 56 is at a high level and the gate 60 is on whereby the voltages at the terminals 62 and 64 are respectively high and low as indicated by the left hand (as viewed in the figure) portions of the curves 76 and 78. Therefore, during quiescent time, a signal lamp connected through a switching means to the output terminal 62 may be on and a signal lamp connected through a switching means to the output terminal 64 may be off.

When it is desired to start a timing cycle, the voltage of the terminal 12 is changed to about —.8 of a volt and the voltage at the terminal 30 is changed to about —1.6 volts as by push button means, not shown. The transistor 10 is turned on and the transistor 20 is turned off. Current then flows from the terminal 22 through the resistors 26 and 24 in series into the emitter and out of the collector of the transistor 28 to the terminal 74. A much smaller current determined by the beta +1 of the transistor 28 flows into the capacitors 68, 70 and 72, charging them whereby the base of the emitter of the transistor 28 becomes more positive in a gradual manner. Since the current flowing into the capacitors 68, 70 and 72 is very small compared to the current flowing through the resistors 24 and 26 and into the emitter of the resistor 28, the charging of the capacitors 68, 70 and 72 is much slower by a factor of the beta +1 of the transistor 28 than in the absence of the transistor 28. In effect, the time constant of the time constant circuit comprising the resistors 26 and 24 and the capacitors 68, 70 and 72, instead of being the product of the sums of these resistors and of these capacitors becomes this product multiplied by the beta +1 of the transistor 28. Since this beta can be as great as 100, a large time constant is provided by resistors and capacitors of relatively small value.

The voltage of the emitter of the transistor 28 which appears at the point 39 rises gradually as the charge on the capacitors increases. The Zener diode 42 is chosen to break down when the junction 39 reaches a predetermined value of about 5.6 volts positive whereby the voltage at the point 58 reaches about —1.2 volts whereupon the gate 56 switches condition. This change in condition in turn changes the condition of the gate 60 to reverse the voltages of the two outputs of the gate 60, that is, the terminal 62 changes from a high to a low voltage and any signal lamp controlled thereby goes out and the terminal 64 changes from a low to a high voltage whereby any signal lamp controlled by the terminal 64 goes on. The length of time necessary to effect this change in voltage condition of the terminals 62 and 64 may be varied by adjustment of the resistor 24. Time delays up to about fifteen seconds between the reversing of the voltages of the inputs applied to the terminals 12 and 30 and the reversal of the voltages between the terminals 62 and 64 may easily be obtained. Since the beta of the transistor 28 will vary with temperature, the time delay will also vary with temperature. The transistor 28 should therefore be chosen to have a minimum change of beta as the temperature thereof varies to minimize any error in timing due to change in temperature.

When the voltages on the input terminals are returned to their original value, that is, when the transistor 10 is nonconductive and the transistor 20 is conductive, the capacitors 68, 70 and 72 are discharged through the diode 40 and the transistor 20.

When the transistor 20 is on, there may be an undesired flow of current into the emitter of the transistor 28 to cause undesired charging of the capacitors 68, 70 and 72. This is prevented by the diode 38, which, as stated above, acts to keep the voltage on the emitter of the transistor 28 at about one-half volt negative, while the transistor 20 is conductive, to block the transistor 28.

The diodes 50 and 48 and the resistor 54 are a clamping circuit and prevent the voltage at the point 58 from going very high in a positive direction to prevent damage to the gate 56. The resistor 46 and the source connected to the terminal 44 tend to keep the input to the gate circuit 56 at about —.7 volt when the Zener diode 42 is conducting to prevent damage to the gate 56. The resistor 46 and the source connected to the terminal 44, being connected to the gate 56, also prevent the input of the gate 56 from having a floating voltage. Furthermore, these two elements also prevent the leakage current which flows through a Zener diode 42 from causing an inadvertent operation of the gate 56. Since the diode 48 is of germanium having a drop of about .1 of a volt between its anode and its cathode in a forward direction and since the diode 50 is a silicon one exhibiting a drop of about .8 of a volt in its forward direction, these elements tend to maintain the voltage at the point 58 at about —.7 volt when the Zener diode 42 is broken down. However, as pointed out above, the voltage at the point 58 will reach about —1.2 at breakdown of the Zener diode 42.

The described timer may be used wherever a timer which may be adjusted to provide a delay of about ten seconds is useful. One use thereof is in computers. A computer may include the basic processing units or BPU, and the input-output units or IOU, and also peripheral equipment, such as card readers, tape stations and other equipment. If the computer were stopped dead, all parts thereof would also stop in the middle of a cycle and any operation in which it was engaged could not be completed since the BPU, the IOU and the peripheral equipment are all involved in the operation of the computer. Therefore, the answer given by the computer would be incorrect. Using the described timer, the same button that reverses the voltage on the two input terminals 12 and 30 and therefore starts the timing period can be made to prevent the BPU from causing execution of any further instructions that may have been fed into it, permitting the computer to complete its cycle in execution of a previously given instruction. Since ten seconds are ample to complete a cycle in which the computer may be engaged, when the light connected through switching means to the output terminal 62 goes off, or conversely when the light connected through switching means to the output terminal 64 goes on, the operator will know that the cycle during which the cycle was stopped was completed, and that the answer given by the computer is correct.

Modifications in the disclosed timer may be made by persons skilled in the art. Therefore the operation hereinabove should be taken as illustrative and not in a limiting sense.

What is claimed is:
1. A timing device including a time constant circuit,
said time constant circuit comprising a transistor having a base and two main electrodes, a resistor having a first and a second terminal, and a capacitor,
said resistor being connected in series with said capacitor through a path including one of said main electrodes and said base, with said first terminal of said resistor connected to said one main electrode,
means to connect one terminal of a voltage source to said second terminal of said resistor and to connect the other terminal of said voltage source to said other main electrode of said transistor for charging of said capacitor, the voltage on said one main electrode rising as said capacitor is charged, whereby the time constant in seconds of said time constant circuit is substantially equal to the product of said resistor in ohms, of said capacitor in farads and the beta +1 of said transistor,
an output circuit connected to the junction of said first terminal of said resistor and said one main electrode, said output circuit having an off and an on condition, means responsive to said main electrode connected to said resistor attaining a predetermined voltage for changing the condition of said output circuit, and means to shunt current flowing through said resistor away from said transistor.

2. A timing circuit comprising a resistor having a first and second terminal, a transistor having two main electrodes and a base electrode, a capacitor, said first terminal being connected to one main electrode of said transistor, said base being connected through said capacitor to a point of reference potential, means for connecting one terminal of a voltage source to said second terminal and to connect the other terminal of said voltage source to the other of said main electrodes of said transistor whereby said capacitor is charged through said one main electrode to base path of said transistor and whereby the voltage on said one main electrode rises in a gradual manner as the capacitor is charged, and means to prevent current flowing in said resistor from flowing through said transistor, and an output circuit having an on and an off condition connected to the junction of said first terminal and said one main electrode and means responsive to the voltage on said one main electrode reaching a predetermined voltage for changing the condition of said output circuit.

3. The combination of a time constant circuit, means for causing said time constant circuit to start a timing cycle, and means to cause operation of a signal at a predetermined point in said cycle, said time constant circuit comprising a resistor having a first and a second terminal, a transistor having an emitter, a collector and a base, a capacitor, a connection from the first terminal of said resistor to said emitter, a connection from said base through said capacitor to a point of reference potential, means to apply a voltage between the second terminal of said resistor and said collector, said means to cause said time constant circuit to start its timing cycle comprising a second and a third transistor each having an emitter, a collector and a base, said emitters being connected together and through a second resistor to a terminal of a potential source, the collector of said second transistor being connected to a point of reference potential and the collector of said third transistor being connected to said first terminal of said first resistor, and means to apply start and stop voltages to the bases of said second and third transistors, said means to cause operation of a signal comprising a Zener diode, an output circuit having on and off conditions, said Zener diode being connected between the emitter of said first transistor and an input terminal of said output circuit, said emitter of said first transistor rising gradually in voltage during timing operation of said timing circuit and causing breakdown of said Zener diode at a predetermined voltage value to apply a voltage to said output circuit to cause it to change its condition.

References Cited
UNITED STATES PATENTS

| | | | |
|---|---|---|---|
| 3,119,027 | 1/1964 | Faust | 307—293 |
| 3,191,066 | 6/1965 | Staudenmayer | 307—293 |

JOHN S. HEYMAN, Primary Examiner

B. P. DAVIS, Assistant Examiner

U.S. Cl. X.R.

307—246, 264